US010193385B2

(12) United States Patent
Sato et al.

(10) Patent No.: US 10,193,385 B2
(45) Date of Patent: Jan. 29, 2019

(54) POWER SYSTEM MONITORING APPARATUS, POWER SYSTEM CONTROL APPARATUS, AND POWER SYSTEM MONITORING METHOD EMPLOYING EVENTS OF ASSUMABLE BREAKDOWNS AND ASSUMABLE OUTPUT CHANGES

(71) Applicant: Hitachi, Ltd., Tokyo (JP)

(72) Inventors: Yasuo Sato, Tokyo (JP); Masahiro Yatsu, Tokyo (JP); Kouichi Hara, Tokyo (JP); Eisuke Kuroda, Tokyo (JP); Osamu Tomobe, Tokyo (JP); Jun Yamazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 15/116,524

(22) PCT Filed: Sep. 19, 2014

(86) PCT No.: PCT/JP2014/074773
§ 371 (c)(1),
(2) Date: Aug. 4, 2016

(87) PCT Pub. No.: WO2015/129084
PCT Pub. Date: Sep. 3, 2015

(65) Prior Publication Data
US 2016/0359363 A1    Dec. 8, 2016

(30) Foreign Application Priority Data

Feb. 28, 2014  (JP) .................................. 2014-037685

(51) Int. Cl.
*G05D 3/12*     (2006.01)
*H02J 13/00*    (2006.01)
(Continued)

(52) U.S. Cl.
CPC .......... *H02J 13/0017* (2013.01); *G05B 17/02* (2013.01); *H02J 3/382* (2013.01);
(Continued)

(58) Field of Classification Search
CPC .......... H02J 13/0017; H02J 3/382; H02J 3/46; H02J 13/0006; G05B 17/02; Y02E 60/74; Y04S 10/30
See application file for complete search history.

(56) References Cited

U.S. PATENT DOCUMENTS 6,218,853 B1 * 4/2001 Liu ...................... H02M 5/293
323/237
8,694,171 B2 * 4/2014 Ichinose ................ F03D 7/048
290/44

FOREIGN PATENT DOCUMENTS

JP    2000-092714 A    3/2000
JP    2000-341856 A    12/2000

OTHER PUBLICATIONS

International Search Report of PCT/JP2014/074773 dated Nov. 25, 2014.

* cited by examiner

*Primary Examiner* — Wissam Rashid
(74) *Attorney, Agent, or Firm* — Mattingly & Malur, PC (57) ABSTRACT

In administration based on the existing (N-1) reliability criteria, an appropriate administration plan may be not drafted in a power system in which renewable energy increases. Accordingly, according to the invention, a power system monitoring apparatus that monitors a power system includes: an input unit that inputs assumable system breakdown data including an occurrence frequency of each assumable breakdown of the power system and assumable output change data including an occurrence frequency of each assumable output change of each generator connected (Continued)

to the power system; and an output unit that generates conditions by which events of the assumable breakdowns and the assumable output changes are combined based on the occurrence frequencies of the assumable breakdown and the assumable output change and outputs a control plan for each of the conditions.

20 Claims, 6 Drawing Sheets

(51) Int. Cl.
    *G05B 17/02*     (2006.01)
    *H02J 3/38*     (2006.01)
    *H02J 3/46*     (2006.01)

(52) U.S. Cl.
    CPC ............ *H02J 3/46* (2013.01); *H02J 13/0006* (2013.01); *Y02E 60/74* (2013.01); *Y04S 10/30* (2013.01)

| ASSUMABLE BREAKDOWN ID (0301) | BREAKDOWN OCCURRENCE SPOT (0302) | BREAKDOWN SITUATION (0303) | FREQUENCY (0304) |
|---|---|---|---|
| F001 | 102 | 2-PHASE 3-WIRE GROUND FAULT | CLASS C |
| F002 | 201 | 3-PHASE 4-WIRE GROUND FAULT | CLASS E |
| : | : | : | : |
| F030 | 152 | 3-PHASE 6-WIRE GROUND FAULT | CLASS D |

[Fig. 4]

| ASSUMABLE OUTPUT CHANGE ID (0401) | OCCURRENCE POWER SUPPLY (0402) | OUTPUT CHANGE SITUATION (0403) | FREQUENCY (0404) |
|---|---|---|---|
| V001 | 223 | BREAKDOWN STOP | CLASS B |
| V002 | 224 | CUTOUT | CLASS B |
| : | : | : | : |
| V999 | 130 | OUTPUT SUPPRESSION | CLASS A |

| CONDITION No. | ASSUMABLE BREAKDOWN GROUP | ASSUMABLE OUTPUT CHANGE GROUP | ASSUMABLE LEVEL |
|---|---|---|---|
| 1 | F001 | V001 | LEVEL 1 |
| 2 | F0015 | V001 | LEVEL 1 |
| 3 | F001 | V001, V002 | LEVEL 2 |
| ⋮ | ⋮ | ⋮ | ⋮ |
| 1999 | F030 | V900, V901, V903 | LEVEL 5 |
| 2000 | F030 | V991, V992, V993 | LEVEL 5 |

POWER SYSTEM MONITORING APPARATUS, POWER SYSTEM CONTROL APPARATUS, AND POWER SYSTEM MONITORING METHOD EMPLOYING EVENTS OF ASSUMABLE BREAKDOWNS AND ASSUMABLE OUTPUT CHANGES

TECHNICAL FIELD

The present invention relates to a power system monitoring apparatus and method of performing monitoring of a commercial power system and drafting of a control plan and a power system control apparatus performing a control instruction based on the control plan.

BACKGROUND ART

In administration of power systems, plan drafts for maintaining supply reliability are important. Even in a case in which defects occur in equipment of the power systems, it is necessary to maintain operations of the power systems and continue power supply. The power system is one of the important social infrastructures. To maintain supply reliability in the power system is one of the duties of power system administrators.

The basic ideas for maintaining the reliability is a preventive plan draft by preliminary analysis. Supply trouble causes which can occur in power systems are assumed preliminarily, and then it is determined whether states in which the supply trouble causes occur can be evaluated in terms of analysis calculation and whether power supply can be continued. Power system administration plans are drafted under the condition that there is no problem even when any of the assumed supply trouble causes occurs.

As an example of the power system administration technologies, stability maintenance control can be exemplified. For example, as in PTL 1 and PTL 2, drafts of optimum stability maintenance countermeasures by collecting measurement information regarding power systems online have been proposed. In this way, advances in calculator technologies and communication technologies improve the reliability of power systems.

CITATION LIST

Patent Literature

PTL 1: JP-A-2000-92714
PTL 2: JP-A-2000-341856

SUMMARY OF INVENTION

Technical Problem

However, in power system administration of the related art including the foregoing PTLs, critical system breakdown is assumed to occur only alone. For example, supply troubles caused due to lightening strike in main segments of power systems or supply troubles caused due to equipment breakdown in large-sized power generators occur infrequently and are low in correlation. For this reason, duplicate occurrence of the troubles has not been considered. There is so-called (N−1) reliability criteria.

In the future, other ideas are requested with the spread of renewable energy typified by solar light or wind power. The kinds of renewable energy generated by utilizing the above-exemplified natural energy are also called output variable type power that has characteristics followed by uncertainty in power generation outputs. Further, the renewable energy is distributed type power and geographically uneven distribution is also followed in resources of natural energy. For example, in forms called mega solar or wind farms, solar power generation facilities or wind power generation facilities are collected and interconnected to systems, as in large-capacity power sources corresponding to large-sized generators typified by existing thermal power generation.

In this case, there is a concern of large state changes occurring frequently and simultaneously due to abrupt changes in weather. For example, in the case of wind power generation, an automatic operation called cutout in which blades are stopped and a generation output is set to zero is performed to ensure mechanical safety in a case in which the speed of wind arriving at the wind power blades is increased to be equal to or greater than a given value. Events of the abrupt changes in weather occur more frequently than the supply trouble causes assumed in the existing reliability maintenance and there is a concern of a probability of the simultaneous occurrence of the events being high in meteorologically correlated districts.

Accordingly, in administration of the related art based on the existing (N−1) reliability criteria, there is a problem that an appropriate administration plan may be not drafted in a power system in which renewable energy increases.

Solution to Problem

To resolve the foregoing problem, according to the invention, there is provided a power system monitoring apparatus that monitors a power system. The power system monitoring apparatus includes: an input unit that inputs assumable system breakdown data including an occurrence frequency of each assumable breakdown of the power system and assumable output change data including an occurrence frequency of each assumable output change of each generator connected to the power system; and an output unit that generates conditions by which events of the assumable breakdowns and the assumable output changes are combined based on the occurrence frequencies of the assumable breakdown and the assumable output change and outputs a control plan for each of the conditions.

A power system control apparatus performing a control instruction to the generator based on the control plan output from the power system monitoring apparatus is also included.

Advantageous Effects of Invention

According to the present specification, an administration plan of a power system designed to appropriately maintain reliability can be generated even in a case in which a plurality of breakdowns and output variations occur in the power system in which output variation type power such as renewable energy increases.

A request for excessive facility countermeasures is not necessary in the spread of renewable energy, and thus a contribution to the promotion of renewable energy can also be achieved.

DESCRIPTION OF EMBODIMENTS

Hereinafter, an embodiment will be described with reference to the drawings. The following description is merely an embodiment and the invention is not intended to be limited to the following specific content.

In the embodiment, a method of drafting a stabilization control plan of a power system by a power system monitoring apparatus and a power system control apparatus (hereinafter referred to as a monitoring control apparatus) in which the invention is adopted will be described. A large-scaled wind power generation facility and solar power generation are interconnected to the power system in addition to a large-sized power generation facility such as thermal power generation. As a stabilization control plan in which a power supply or the like is a control target, a preliminary draft for emergency control such as power shutdown which is performed immediately after system breakdown occurs and a preventive control draft for suppressing wind power generation amount to reduce necessity of the emergency control are performed, and a function of presenting the drafts to an administrator is provided.

Figure 1:
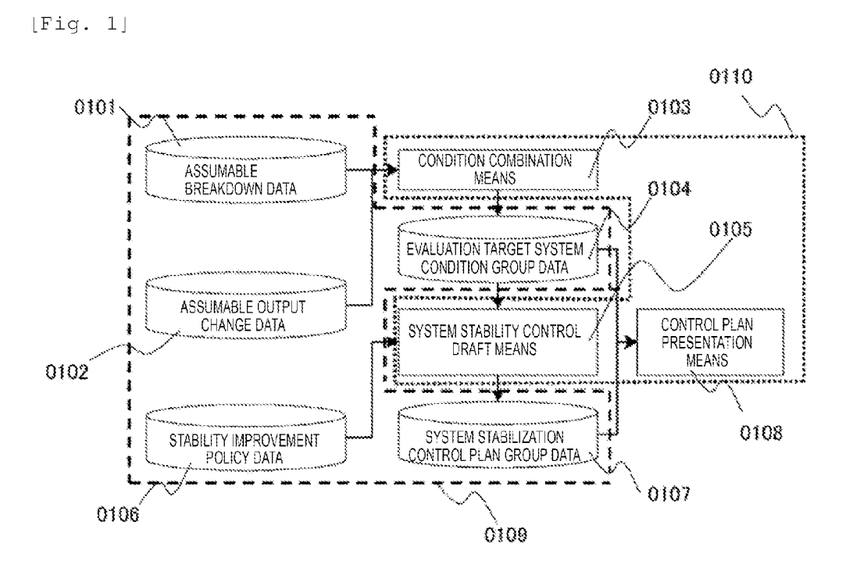
FIG. 1 is a diagram illustrating an example of the configuration and a processing flow of a power system monitoring apparatus according to the invention.

FIG. 1 is a diagram illustrating an example of the configuration and a processing flow of the power system monitoring apparatus to which the present specification is applied. An overview of a processing order will be described below.

Figure 2:
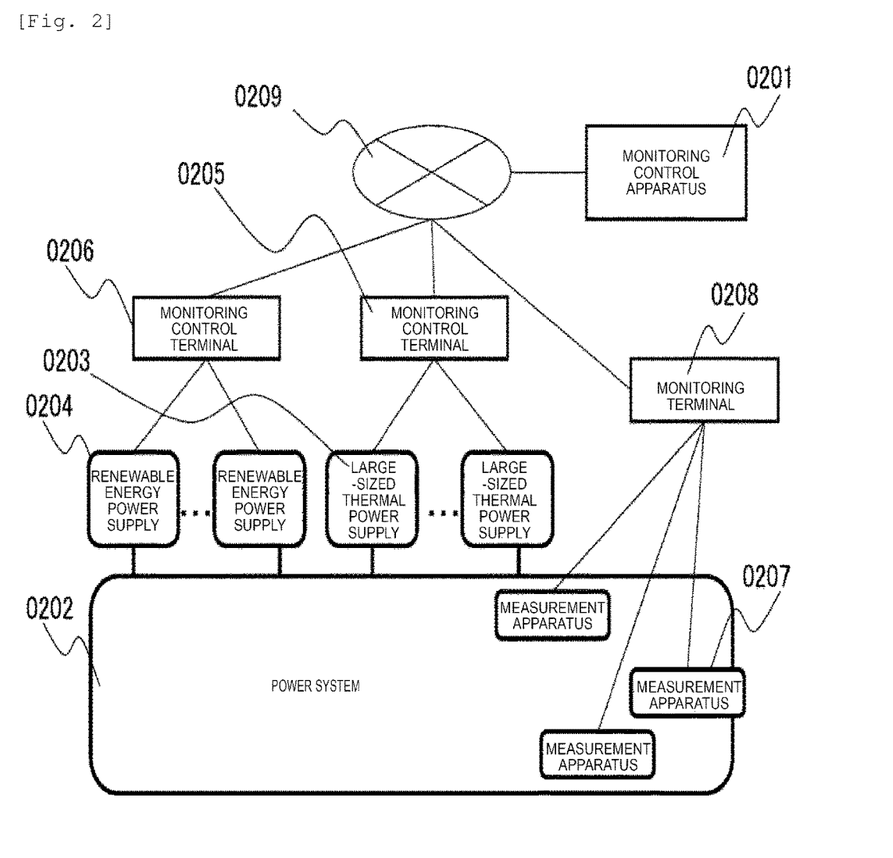
FIG. 2 is a diagram illustrating an installation example of the power system monitoring apparatus and a power system control apparatus according to the invention.

As in the monitoring control apparatus 0201 in FIG. 2, the monitoring control apparatus can transmit and receive data to and from monitoring control apparatuses 0205 and 0206 that monitor and control the large-sized thermal power supplies 0203 or renewable energy power supplies 0204 interconnected to a power system 0202 and a monitoring terminal 0208 that monitors a measurement apparatus 0207 measuring a current distribution in the power system via a communication network 0209.

Figure 3:
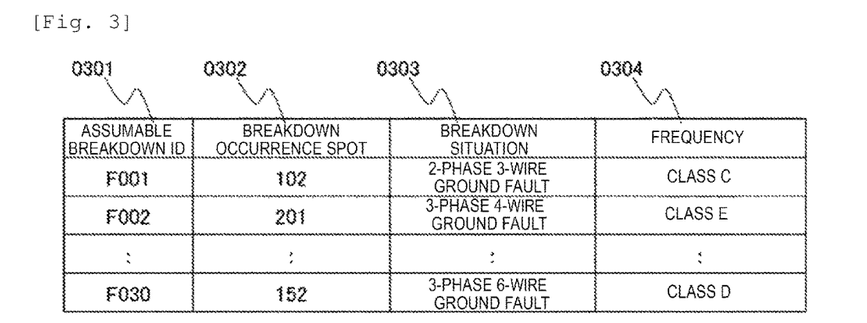
FIG. 3 is a diagram illustrating an example of the configuration of a database that stores data indicating assumable breakdowns.

An assumable breakdown database 0101 is a storage unit that stores detailed content regarding assumable events causing supply troubles, such as lightening strike, in a main segment of the power system. As the configuration database, as in FIG. 3, reference numeral 0302 denoting an assumable occurrence spot in the power system, reference numeral 0303 denoting a breakdown phase, and reference numeral 0304 denoting a frequency of the breakdown are stored for each reference numeral 0301 denoting an assumable breakdown ID. Here, reference numeral 0302 denoting an assumable occurrence spot is associated with separately defined power system spot information. For example, a transmission end of and a reception end of a power transmission line, a bus line, and the like can be indicated. As the breakdown phase, for example, 2-phase 3-wire breakdown in a 3-phase 3-wire power transmission line of a 2-line joint is defined according to a general expression. The frequency 0304 is associated with separately defined occurrence frequency class information. For example, class A in which breakdown continuously occurs 50 times or more per year for one minute or more to occurrence frequency class E in which a continuous time is short at an occurrence probability equal to or less than 0.1 times per year can be defined.

Figure 4:
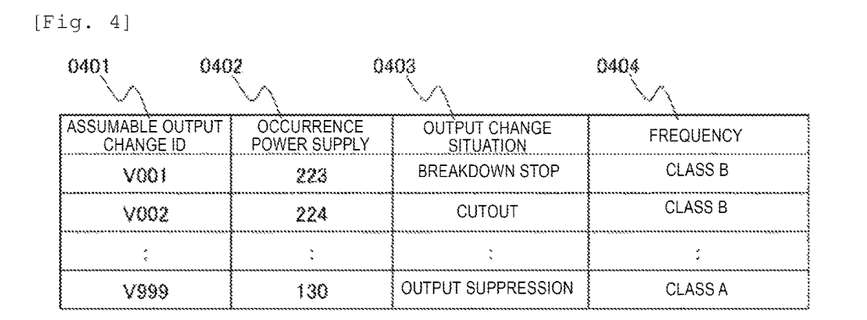
FIG. 4 is a diagram illustrating an example of the configuration of a database that stores data indicating assumable output changes.
Figure 5:
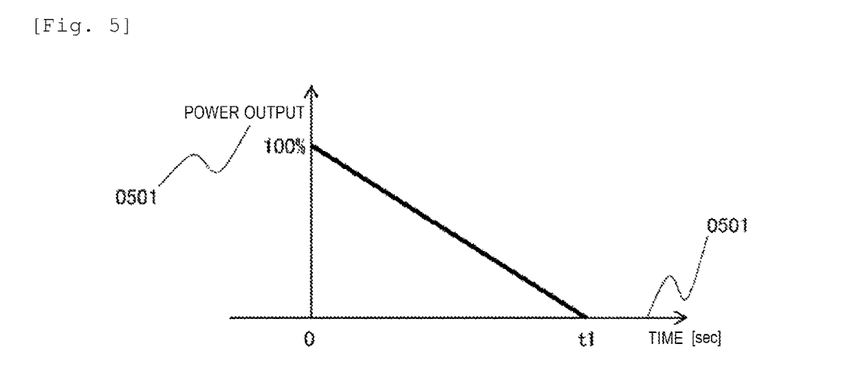
FIG. 5 is a diagram illustrating an example of an expression indicating the assumable output changes.

An assumable output change database 0102 is a storage unit that stores detailed content regarding an output change of a power generation facility group which can affect a main current of the power system, such as simultaneous cutout of a large-scaled wind power generation farm. As the configuration of the database, as in FIG. 4, reference numeral 0402 denoting an occurrence power supply, a letter string 0403 denoting an output change phase, and reference numeral 0404 denoting an occurrence frequency are stored for each reference numeral 0401 denoting an assumable output change ID. Here, reference numeral 0402 denoting an assumable occurrence power supply is associated with the separately defined power system spot information. For example, a bus line interconnected to a large-scaled wind power generation farm is indicated. The output change phase is separately defined. For example, for cutout of wind power generation, as in FIG. 5, a form is defined in which a power output represented by the vertical axis 0502 decreases from a rated value to 0 during a period from occurrence of an output change denoted by the horizontal axis 0501 to t1 seconds. Similarly, output suppression or the like is also defined due to breakdown stops or defects of a solar power generation facility or a wind power generation facility. The frequency 0404 is associated with occurrence frequency class information as in the frequency 0304 of the assumable breakdown database 0101. The assumable output change is defined as an event which can occur more frequently than an assumable breakdown.

Condition combination means 0103 generates a system condition group which is an evaluation target in the stabilization control draft with reference to content of the assumable breakdown database 0101 and the assumable output change database 0102. Here, evaluation target system conditions mean combinations of a plurality of assumable breakdowns and a plurality of assumable output changes. As a combination method in the condition combination means, there are various processing methods. In the embodiment, a process of generating the combinations step by step in consideration of the occurrence frequency of each of the assumable breakdowns and the assumable output changes is performed. When the combinations are generated, the combinations are generated through the following process based on spot information of the assumable breakdowns and the assumable output changes. For example, a case of a high geographical correlation because of a geographically close position and a case of a possibility of simultaneous occurrence are appropriately considered. First, as level 1, a combination in which an event where a single output change is duplicated with a single assumable breakdown is assumed is generated. The combination is generated by extracting only an event where a class having a high occurrence frequency of both of the assumable breakdown and the assumed output change is designated. Next, as level 2, a combination in which an event where two output changes are duplicated with a single assumable breakdown is assumed is generated. Similarly, the combination is generated for each assumable level according to the idea of separately decided administration rules. In addition to the stepwise combination generation method, a method of giving a probability value according to the class indicating the occurrence frequency and automatically generating combinations in which a probability of multiple occurrence of a plurality of assumable breakdowns and assumable output changes is equal to or less than a given value is also be considered. Since the number of combination is vast, a mathematical programming scheme such as dynamic programming is applied to generate meaningful combinations rapidly. By also storing data indicating a geographic correlation between the output change events in the assumable output change database, a method of calculating a conditional probability in the automatic generation is also considered.

Figure 6:
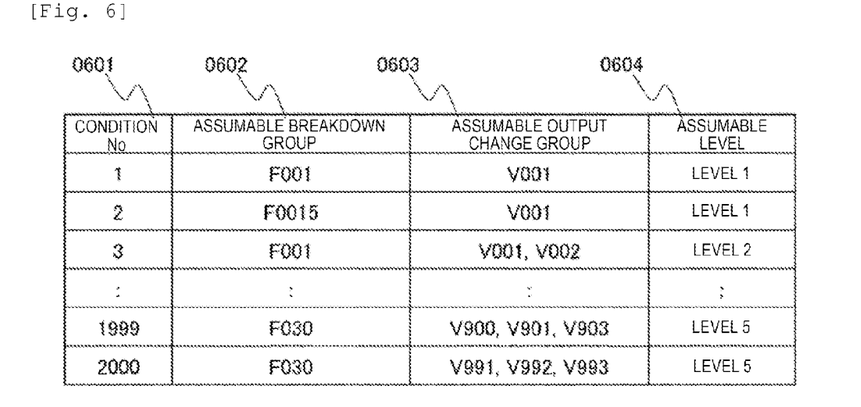
FIG. 6 is a diagram illustrating an example of the configuration of a database that stores evaluation target system condition data.

The results of the condition combination means are stored in an evaluation target system condition group database 0104 illustrated in FIG. 6. A letter string 0602 indicating an assumable breakdown group adopted in the system conditions, a letter string 0603 indicating the assumable output change, and reference numeral 0604 indicating an assumable level are stored for each reference numeral 0601 denoting a listed serial number which is a condition No. Expressions of the letter strings 0602 and 0603 follow the expressions of the assumable breakdown ID in the assumable breakdown database and the assumable output change ID in the assumable output change database, and indicate letter strings meaning one event or a plurality of events.

Next, system stabilization control draft means 0105 preliminarily drafts stabilization control content necessary in a case in which the system condition occurs by repeatedly executing a simulation that simulates a time-series reaction of the power system. In order to maintain transient stability, for example, a simulation is executed to ascertain a reaction of an internal phase difference angle of an individual large-sized thermal generator in the time axis 0701 and the vertical axis 0702 as in FIG. 7. A behavior is simulated at time T1 at which a breakdown is troubleshot and subsequent times when time T0 at which the power system is changed from a normal state to a system state is set as a standard. For the generator in which the internal phase difference angle is greater than a threshold value 0703 at time T2, emergency power shutdown is determined to be necessary as power control. Moreover, by evaluating the simulation in a case in which the power control is performed, it is determined whether the transient stability is maintained, that is, transitions 0704 of the internal phase difference angles of other generators converges. In a case in which the transient stability is unstable, an additional power control target generator is selected from the behavior of the internal phase difference angle. By repeating such processes, the control plan of the combination or the like of the power control necessary to maintain the transient stability is appropriately changed. The system stabilization control draft means 0105 also preliminarily drafts control to maintain a system voltage. A simulation is executed to ascertain a reaction of a node voltage in a main mode in the power system when the vertical axis 0705 is a time axis. In a case in which a node of which the voltage is less than a given level 0706 occurs, an input of a voltage compensation apparatus designed to recover the voltage of a voltage reduction node is drafted, and simulation evaluation is performed again in a case in which the control is assumed. A system stabilization control plan for converging a transition 0707 of each node voltage within an appropriate range by repeating the operation is appropriately changed and drafted.

Figure 8:
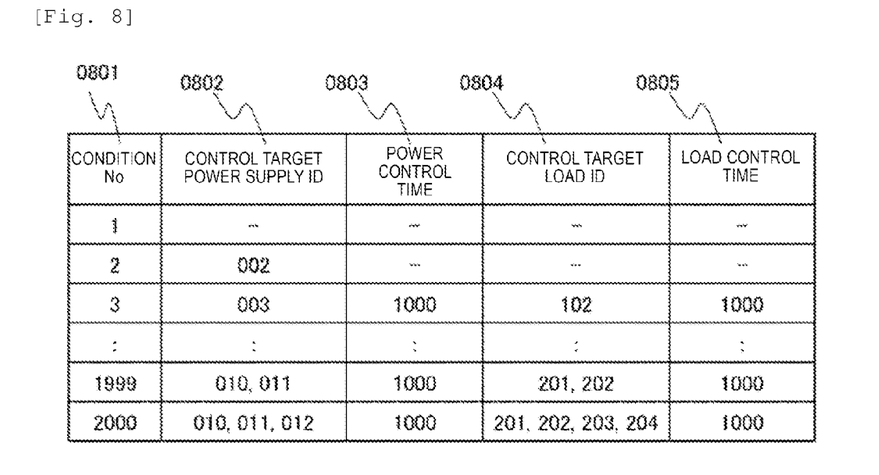
FIG. 8 is a diagram illustrating an example of the configuration of a database that stores a control plan for system stability maintenance.

As the result of the system stabilization control draft means, a system stabilization control plan group database 0107 illustrated in FIG. 8 is generated. Reference numeral 0801 denotes a common condition No to the evaluation target system condition group database 0104. A sequence 0802 indicating a control target power supply ID group, a numerical value 0803 indicating a power control time, a sequence 0804 indicating a control target load ID group, and a numerical value 0805 indicating a load control time are stored for each condition No. The power control time and the load control time are set using a change time from a normal state to the system state as a standard.

Figure 7:
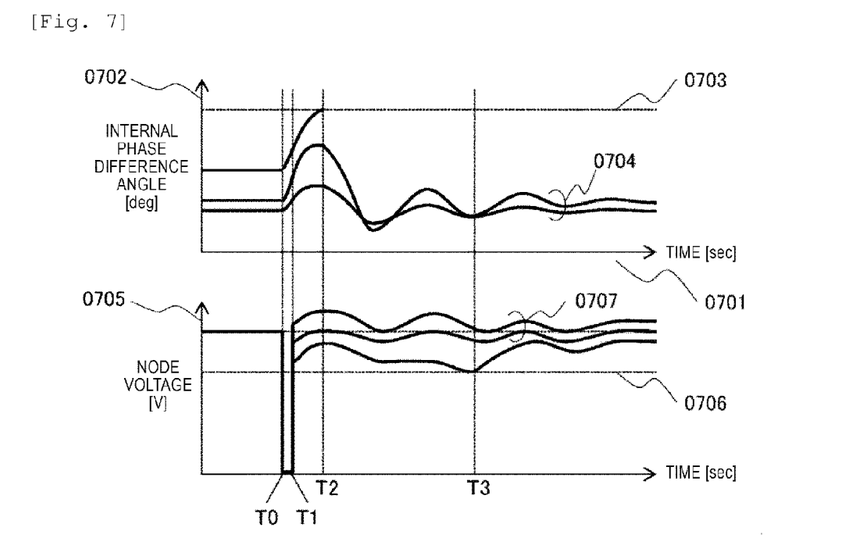
FIG. 7 is a diagram illustrating an example of transient stability evaluation of the power system.
Figure 9:
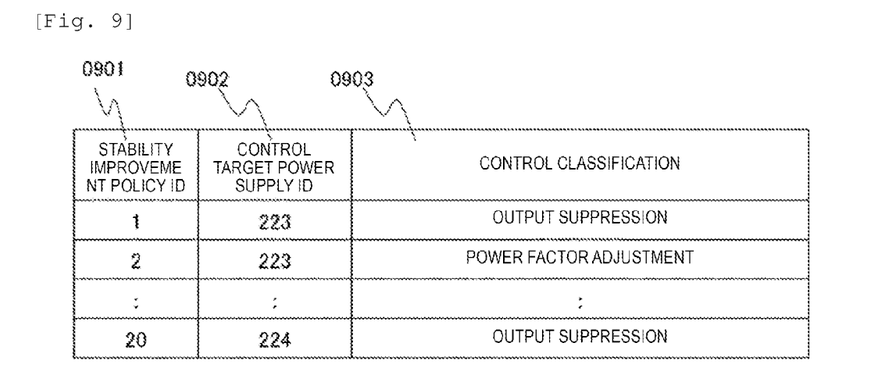
FIG. 9 is a diagram illustrating an example of the configuration of a database that stores data indicating an assumable stability improvement policy.
Figure 10:
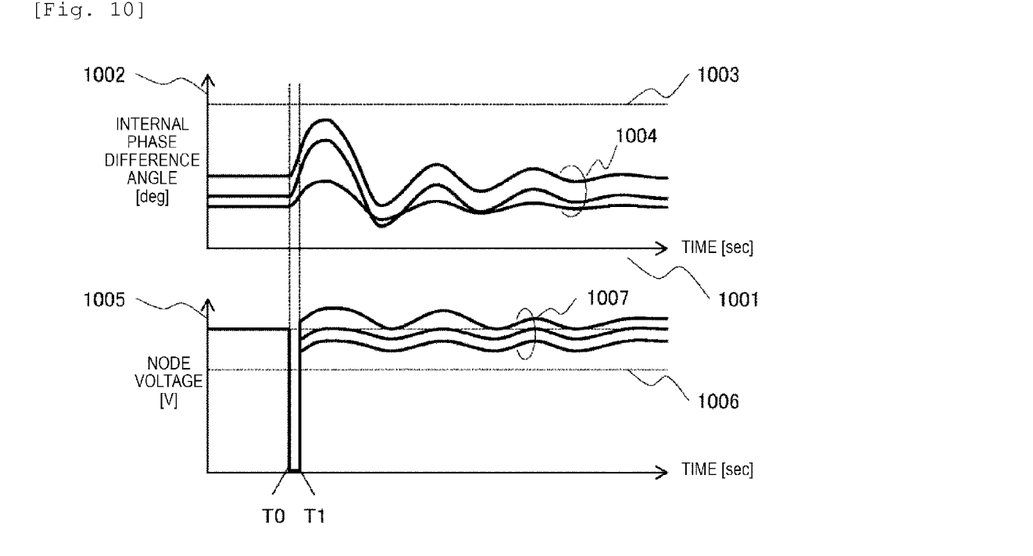
FIG. 10 is a diagram illustrating an example of the transient stability evaluation of the power system followed by the assumable stability improvement policy.

The system stabilization control draft means 0105 performs evaluation in regard to a stability improvement policy. The stability improvement policy is preliminarily drafted in an assumable stability improvement policy database 0106 illustrated in FIG. 9. A numerical value 0902 indicating a control target power supply ID and reference numeral 0903 denoting control classification are stored for each numerical value 0901 by which the stability improvement policy is managed with a serial number. The control classification is control content of a preliminarily defined generator. For example, an instruction to suppress power output at a regulation ratio on a wind power generation facility is expressed. The stabilization control content is preliminarily drafted in the same order as the order illustrated in FIG. 7 by assuming a case in which one stability improvement policy or a plurality of stability improvement policies are implemented. First, as evaluation of the transient stability, the reaction of the internal phase difference angle of the individual large-sized thermal generator is simulated on a time axis 1001 and a vertical axis 1002. For example, a generator in which the internal phase difference angle is greater than a threshold value 1003 disappears according to the stability improvement policy, and thus it is confirmed that transitions 1004 of the internal phase difference angles of all the generators converge. In a case in which there is a generator in which the internal phase difference angle exceeds the threshold value 1003, as in the operation of FIG. 7, combinations of power control necessary to maintain the transient stability are generated by repeating a process of selecting power control target generators. The same process as that of FIG. 7 is performed on the system voltage. By repeatedly inputting the voltage compensation apparatus designed to recover the voltage of the node of which the voltage is reduced until a node of which the voltage is less than a given level 1006 does not occur using a node voltage of a main node is used as a vertical axis 1005, system stabilization control for converging transitions 1007 of node voltages to an appropriate range is drafted.

Stability control content in a case in which the stability improvement policy is assumed is also stored in the system stabilization control plan group database 0107. A system stabilization control draft result of each stability improvement policy is stored as a data table having the configuration illustrated in FIG. 8.

Figure 11:
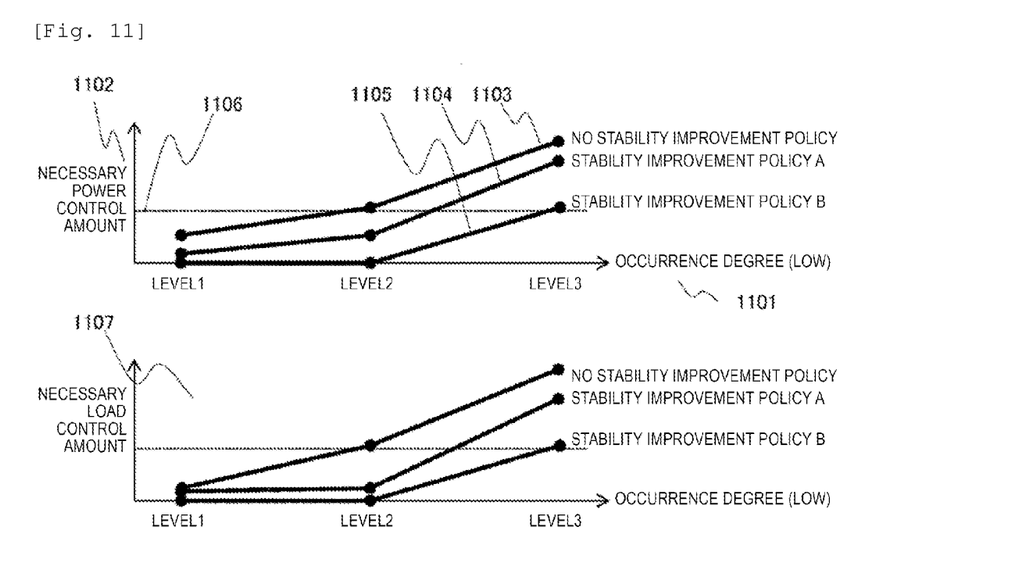
FIG. 11 is a diagram illustrating an example of the configuration of screen of a control plan presentation means.

Finally, control plan presentation means 0108 will be described. An operation screen providing the control plan presentation means includes, for example, display illustrated in FIG. 11. On a horizontal axis 1101, a level indicating the occurrence frequency of the evaluation target system condition is digitized. As described above in the condition combination means 0103, the occurrence frequency of the evaluation target condition in which the plurality of assumable breakdowns and the plurality of assumable output changes are combined is quantified and expressed as a probability value from the occurrence frequencies of the plurality of assumable breakdowns and the plurality of assumable output changes. In the embodiment, events of level 1 become a combination group in which events where a single output change is duplicated with a single assumable breakdown are assumed. A vertical axis 1102 represents a power control amount in the system stabilization control drafted in the evaluation target system condition of each level. A plurality of evaluation target system conditions belong to one level, and a sum value of power control amounts is adopted for a system stabilization control draft result group necessary in the evaluation target system condition group. Graphs with bent line shapes can be obtained by obtaining and plotting the power control amounts for each level. For example, a bent line 1103 indicates a change in the power control amount according to levels in a case in which no stabilization improvement policy is implemented. Similarly, bent lines 1104 and 1105 indicate the power control amounts in a case in which different stability improvement polices are assumed. By setting a separately regulated allowable power control amount 1106 as a determination standard, an allowed level of the system change can be determined in a case in which there is no stability improvement policy. In a case in which there is a level for the purpose of stability maintenance, it is possible to determine which stability improvement policy is implemented to suppress the assumable control amount to a power control amount equal to or less than the allowable power control amount. Similarly, a separate graph 1107 visualizes necessary load control amounts according to levels of the load control amounts. Like the idea of the above-described allowable power control amount, an operator of the screen can obtain a material for determining by which level the system change is allowed from a system state at a current time and determining which stability improvement policy is necessary.

In FIG. 1, a storage medium such as a memory and a CPU can be classified as main constituents of hardware of the power system monitoring apparatus. Thus, the assumable breakdown database 0101, the assumable output change database 0102, the evaluation target system condition group database 0104, the assumable stability improvement policy database 0106, and the system stabilization control plan group database 0107 that store data to be input to a processing unit to be described below are classified as a storage unit 0109. Further, the condition combination means 0103, the system stabilization control draft means 0105, and the control plan presentation means 0108 which are processing functions of the CPU that generates a control plan based on the data input from the storage unit and presents and outputs the control plan are classified as a processing unit 0110.

The monitoring control apparatus to which the above-described present specification is applied can be used. Thus, in a case in which the system state is considerably changed, content of necessary power control and load control can be immediately ascertained with reference to the system stabilization control plan group database. By providing a function of monitoring a power system situation including an output variable type power supply of wind power generation or the like online and an online determination mechanism and a control instruction mechanism of the system state change, it is possible to perform a control plan quickly according to a system situation. The control plan is evaluated in accordance with a high frequent output change such as cutout of wind power generation as well as evaluation of a system breakdown in conformity to the existing (N−1) reliability criteria. Compared to a stabilization control plan preliminarily set based on offline analysis, a contribution to system stabilization is achieved while suppressing excessive control.

Further, since a control advantage can be preliminarily evaluated for the system stabilization control plan which can be preliminarily drafted, such as output suppression of wind power generation, according to the technology, appropriate preventive control can also be adopted in business of power system administration.

As a result, the uncertainty of wind power generation or solar power generation can be appropriately handled with the reliability of the power system. A request for excessive facility countermeasures is not necessary in spread of renewable energy, and thus a contribution to promotion of renewable energy can also be achieved.

REFERENCE SIGNS LIST 0101 assumable breakdown database
0102 assumable output change database
0103 condition combination means
0104 evaluation target system condition group database
0105 system stabilization control draft means
0106 assumable stability improvement policy database
0107 system stabilization control plan group database
0108 control plan presentation means
0109 storage unit
0110 processing unit
0201 monitoring control apparatus
0202 power system
0203 large-sized thermal power supply
0204 renewable energy power supply
0205, 0206 monitoring control terminal
0207 measurement apparatus
0208 monitoring terminal
0209 communication network

The invention claimed is:

1. A power system monitoring apparatus that monitors a power system, the apparatus comprising a processor coupled to the power system and programmed to:
input assumable system breakdown data, which is data of assumable breakdown of the power system, including an occurrence frequency of each assumable breakdown of the power system and assumable output change data including an occurrence frequency of each assumable output change of each generator connected to the power system; and
generate conditions by which events of the assumable breakdowns and the assumable output changes are combined based on the occurrence frequencies of the assumable breakdown and the assumable output change and outputs a control plan to control said each generator for each of the conditions;
wherein an event of an assumable breakdown is an event of breakdown that is assumed to cause supply troubles in a main segment of the power system; and wherein an event of an assumable output change is an event of output change of a power generation facility group which can affect a main current of the power system.

2. The power system monitoring apparatus according to claim 1,
wherein the processor is programmed to simulate whether an internal phase difference angle of said each generator and a voltage of a predetermined node in the power system converge within a predetermined range under the condition and change the control plan based on a result of the simulation.

3. The power system monitoring apparatus according to claim 1,
wherein the processor is programmed to display the control plan for each of the conditions by a correlation between the occurrence frequency and a control amount.

4. The power system monitoring apparatus according to claim 1,
wherein the assumable system breakdown data includes spot information of the assumable breakdown, the assumable output change data includes spot information of the assumable output change, and the conditions are generated based on the spot information.

5. The power system monitoring apparatus according to claim 4,
wherein the condition is weighted between the events of the assumable output change based on the spot information.

6. The power system monitoring apparatus according to claim 1,
wherein the conditions are generated by combinations of the events of the assumable breakdowns and the assumable output changes in which the occurrence frequencies are within a predetermined range.

7. The power system monitoring apparatus according to claim 1,
wherein the assumable system breakdown data includes data of a breakdown phase according to a breakdown occurrence spot.

8. The power system monitoring apparatus according to claim 1,
wherein the assumable output change data includes data of an output change phase of each generator.

9. The power system monitoring apparatus according to claim 8,
wherein the data of the output change phase includes an output change amount and an output change speed.

10. The power system monitoring apparatus according to claim 8,
wherein the data of the output change phase includes a cutout event of wind power generation.

11. The power system monitoring apparatus according to claim 1,
wherein the processor is programmed to input and use a preliminarily set control policy of each generator to generate the control plan.

12. The power system monitoring apparatus according to claim 1, wherein a control instruction to said each generator based on the control plan output is performed to control said each generator.

13. A power system monitoring method of monitoring a power system, the method comprising:
inputting assumable system breakdown data, which is data of assumable breakdown of the power system, including an occurrence frequency of each assumable breakdown of the power system and assumable output change data including an occurrence frequency of each assumable output change of each generator connected to the power system; and
generating conditions by which events of the assumable breakdowns and the assumable output changes are combined based on the occurrence frequencies of the assumable breakdown and the assumable output change and outputting a control plan to control said each generator for each of the conditions;
wherein an event of an assumable breakdown is an event of breakdown that is assumed to cause supply troubles in a main segment of the power system; and
wherein an event of an assumable output change is an event of output change of a power generation facility group which can affect a main current of the power system.

14. The power system monitoring method according to claim 13, further comprising:
simulating whether an internal phase difference angle of said each generator and a voltage of a predetermined node in the power system converge within a predetermined range under the condition and changing the control plan based on a result of the simulation.

15. The power system monitoring method according to claim 13, further comprising:
displaying the control plan for each of the conditions by a correlation between the occurrence frequency and a control amount.

16. The power system monitoring method according to claim 13,
wherein the assumable system breakdown data includes spot information of the assumable breakdown, the assumable output change data includes spot information of the assumable output change, and the conditions are generated based on the spot information.

17. The power system monitoring method according to claim 16, further comprising:
weighting the condition between the events of the assumable output change based on the spot information.

18. The power system monitoring method according to claim 13,
wherein the conditions are generated by combinations of the events of the assumable breakdowns and the assumable output changes in which the occurrence frequencies are within a predetermined range.

19. The power system monitoring method according to claim 13,
wherein the assumable output change data includes data of an output change phase of each generator; and
wherein the data of the output change phase includes an output change amount and an output change speed.

20. The power system monitoring method according to claim 13, further comprising:
performing a control instruction to said each generator based on the control plan output.

* * * * *